United States Patent Office
3,228,835
Patented Jan. 11, 1966

3,228,835
METHOD AND COMPOSITIONS FOR COMBATING DEPRESSION AND SPASM
Carl D. Lunsford, Richmond, Va., assignor to A. H. Robins Company, Inc., Richmond, Va., a corporation of Virginia
No Drawing. Filed Oct. 22, 1962, Ser. No. 232,290
12 Claims. (Cl. 167—65)

The present invention relates to novel therapeutic compounds and is more particularly concerned with certain organic compounds having anticholinergic activity, a method of employing such compounds for purposes of exploiting their anticholinergic activity in the treatment of a living animal body, and compositions containing such an anticholinergically active compound as active ingredient.

Antichlolinergic agents are useful in treating spasm of various types, such as commonly associated with spastic constipation, biliary duct spasm, arterial spasm, and similar conditions. The compounds of the invention are active anticholinergics useful for treating spasm of the type induced by acetyl choline. Employment of the anticholinergic agents of the invention in the treatment of Parkinsonism is of particular interest. Parkinsonism is a condition involving disturbance of certain brain centers, such as the mesodiencephalic activating center of the brain stem, which causes muscular rigidity and may impair normal movements and the ability to speak and write. It results from injury to basal ganglia and is frequently a sequel to virus-caused epidemic (lethargic) encephalitis. Symptoms include involuntary tremors, lack of facial expression, depressed emotional tone, and salivation.

Compounds which control these symptoms are, in general, anticholinergic agents which are capable of passing the blood brain barrier. Atropine and extracts from various species of Stramonium flora have long been used in treating Parkinsonism, and more recently other anticholinergic agents, such as trihexylphenidyl, procyclidine, ethopropazine, and diethazine have been so employed. The degree of utilization of any such anticholinergic agent is restricted by the undesirable side effects which it may concurrently produce. Dryness of the mouth, blurred vision, mydriasis, epigastric distress, nausea and constipation are examples of peripheral side effects. The capacity to produce desired anticholinergic effects without the usual side effects is a highly desirable attribute of an anticholinergic. Effective agents having such an attribute have long been sought without the attainment of any complete solution to the problem.

It is therefore an object of the present invention to provide novel compounds and compositions possessing valuable therapeutic properties, that is, anticholinergic activity. Another object is to provide a novel method for the treatment of living animal and especially mammalian bodies, for purposes of combating spasm therein. Still another object is to provide compositions which possess beneficial anticholinergic activity without deleterious peripheral activity, and which are therefore particularly useful in combating spasm in a living animal body. A particular obejct of the present invention is to provide novel anticholinergic agents whic hare capable of passing the blood brain barrier, compositions thereof, and a method for the treatment of Parkinsonism therewith. Additional objects will be apparent to one skilled in the art and still other objects will become apparent hereinafter.

The foregoing and additional objects are accomplished by the provision of certain 1-lower-alkyl-3-pyrrolidyl N,N-di(monocarbocyclic aryl)-carbamates, non-toxic pharmacologically acceptable acid-addition salts thereof, and compositions containing the same as active ingredient, and by employing such compounds and/or compositions to combat, diminish, eliminate, or ameliorate spasm in a living animal body treated therewith.

The frequency and magnitude of peripheral side effects exhibited by pre-existing anticholinergic drugs would indicate that it is extremely unusual if not impossible to isolate the desired central anticholinergic activity from concurrent undesired peripheral side effects. Unpredictably, the 1-lower-alkyl-3-pyrrolidyl N,N-diphenylcarbamates of the invention not only exhibit a high order of central anticholinergic activity, but also extremely low peripheral side effects.

In addition to the usefulness of the 1-lower-alkyl-3-pyrrolidyl N,N-di(monocarbocyclic aryl)-carbamates and their non-toxic salts as strong central anticholinergics and especially in the treatment of Parkinsonism, they may also be employed in the therapy and prevention of extrapyramidal symptoms caused by other drugs. Moreover, the anticholinergic agents of the invention have valuable antidepressive activity.

The active anticholinergic agents of the present invention are preferably compounds having the formula:

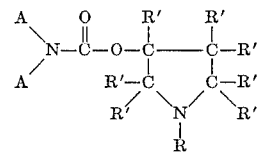

Formula I wherein each A is moncarbocyclic aryl, preferably phenyl, wherein R' is hydrogen or methyl, preferably a maximum of two R' being other than hydrogen, and wherein R is lower-alkyl containing up to four carbon atoms inclusive, preferably methyl, and non-toxic pharmacologically acceptable acid addition salts thereof. These compounds are generically designated the 1-lower-alkyl-3-pyrrolidyl N,N-di(monocarbocyclic aryl)-carbamates and are so referred to herein.

By a "monocarbocyclic aryl" radical is meant an aryl radical of the benzene series, having six ring carbon atoms, and this term includes the unsubstituted phenyl radical as well as phenyl radicals substituted by any radical or radicals which are non-toxic and not reactive or other wise interfering under the conditions of preparation of the compounds, such as trifluoromethyl, lower-alkoxy, di-lower-alkyl-amino, lower-alkyl, halo, and the like. The substituted phenyl radicals have preferably no more than three substituents such as those given above and, furthermore, these substituents can be in various available positions of the phenyl nucleus and, where more than one substituent is present, can be the same or different and can be in various position combinations relative to each other. The lower-alkyl, lower-alkoxy, and di-lower-alkyl-amino ring substituents each have preferably from one to four carbon atoms which can be arranged as straight or branched chains. A total of nine carbon atoms in all ring substituents is the preferred maximum.

The term "lower-alkyl" as applied herein in defining the N or 1-substituent includes only those straight and branched chain radicals containing up to four carbon atoms inclusive, and is exemplified by such groups as methyl, ethyl, propyl, isopropyl, butyl, isobutyl, tertiary butyl, and the like. When the lower-alkyl group contains more than four carbon atoms or is cycloalkyl or aralkyl, the anticholinergic activity is markedly reduced.

The compounds of the present invention are most conveniently employed in the form of water-soluble non-toxic acid-addition salts. The free basic compounds of Formula I may be conveniently converted into these salts by reaction of the free base with the selected acid in the presence of an organic solvent which is inert to the reactants and reaction product under the conditions of reaction. The acids which can be employed to prepare the preferred non-toxic pharmacologically acceptable acid-addition salts are those which produce, when combined with the free bases, salts the anions of which are relatively innocuous to the animal organism in therapeutic doses of the salts, so that beneficial physiological properties inherent in the free bases are not vitiated by side effects ascribable to the anions. Appropriate acid-addition salts are those derived from minerals acids such as hydrochloric acid, hydrobromic acid, hydroiodic acid, nitric acid, sulfuric acid, and phosphoric acid, and organic acids such as acetic acid, citric acid, lactic acid, tartaric acid, alkyl and arylsulfonic acids, and the like. The preferred acid-addition salt is the maleic acid salt.

Acid-addition salts are prepared either by dissolving the free base in an aqueous solution containing the appropriate acid, or to which the acid is subsequently added, and isolating the salt by evaporating the solution, or by reacting the free base and the selected acid in an organic solvent, in which the case the salt ordinarily separates directly or can be conventionally recovered by concentration of the solution or the like. Where the free basic amine is desired, this may be obtained conventionally by neutralizing the reaction product or a solution of the isolated salt with a base such as ammonia, ammonium hydroxide, sodium carbonate, or other suitable alkaline material, extracting the liberated base with a suitable solvent such as ethyl acetate or benzene, drying the extract and evaporating to dryness in vacuo or fractionally distilling, or in other conventional manner.

In their most advantageous forms for administration, the compositions of the present invention contain a non-toxic pharmaceutical carrier in addition to the active anticholinergic agent. Exemplary carriers are: solids such as lactose, magnesium, stearate, calcium stearate, starch, terra alba, dicalcium phosphate, sucrose, talc, stearic acid, gelatin, agar, pectin, or acacia and liquids such as peanut oil, sesame oil, olive oil, or water.

A wide variety of pharmaceutical forms, suitable for many modes of administration and dosages, may be employed. For oral administration the active anticholinergic agent and pharmaceutical carrier may, for example, take the form of a pill, lozenge, tablet, capsule, or a liquid suspension; for parenteral administration the composition may be in the form of a sterile solution; and for rectal administration, the form may be a suppository.

The compounds of the present invention are usually administered in compositions containing from about 0.01 to 75 percent, by weight, of anticholinergic agent, preferably 0.05 to 25 percent.

The method of treating according to the invention comprises internally administering an anticholinergically effective amount of a compound of Formula I, including non-toxic acid-addition salts thereof, preferably admixed with a pharmaceutical carrier, for example, in the form of any of the above-mentioned compositions, to combat spasm including Parkinsonism and symptoms thereof in a living animal body. The 1-lower-alkyl-3-pyrrolidyl N,N-di(monocarbocyclic aryl)-carbamates may be advantageously employed in a unit dosage of from 0.1 to 200 milligrams. This unit dosage may be given a suitable number of times daily to that the daily dose will vary from 0.3 to 600 milligrams. The oral unit dosage will preferably vary from about 2.5 to 50 milligrams while the parenteral dosage will usually be approximately one-half the oral dosage so that the preferred parenteral unit dosage will be about 1 to 25 milligrams. The preferred daily dosages will vary from about 7.5 to 150 milligrams (oral) and about three to 75 milligrams (parenteral). However, with this type of drug there is considerable variation in individual dosage. The invention therefore should not be limited to the exact ranges stated. The exact dosages suitable for a particular patient will of course have to be as determined and directed by the physician or veterinarian in charge. In addition, the active ingredients of the present invention or compositions containing the same may either be administered together with or include other physiologically active materials and/or medicaments, e.g., buffering agents, antacids, sedatives, tranquilizers, analgesics, or the like.

The high order of activity of the active agents of the present invention, as evidenced by tests in lower animals (representative of which are reported hereinafter), is indicative of utility based on their valuable activity in human beings as well as in lower animals. Clinical evaluation in human beings has not been completed, however. It will be clearly understood that the distribution and marketing of any compound or composition falling within the scope of the present invention for use in human beings will of course have to be predicated upon prior approval by governmental agencies such as the Federal Food and Drug Administration which are responsible for a determination of and authorized to pass on such questions.

The anticholinergic agents of the invention, the 1-lower-alkyl-3-pyrrolidyl N,N-di(monocarbocyclic aryl)-carbamates, may be conveniently prepared by reaching an alkali or alkaline earth metal alcoholate of the corresponding 1-lower-alkyl-3-pyrrolidinol with the appropriate di-(monocarbocylic-aryl)-carbamyl chloride, such as diphenylcarbamyl chloride, or other conventional methods for the production of carbamates may be employed. The metal alcoholates may in turn be produced by using as one reagent an alkali or alkaline earth metal, e.g., sodium, potassium, or calcium, or an alkali or alkaline earth metal hydride, e.g., lithium hydride, or an alkali or alkaline earth metal amide, e.g., sodium amide, or a similar alkali or alkaline earth metal reagent capable of reacting with the selected pyrrolidinol to produce a metal alcoholate. This reagent is accordingly mixed and reacted with the selected 1-lower-alkyl-3-pyrrolidinol, comprising unsubstituted or methyl or polymethyl-1-lower-alkyl-3-pyrrolidinols, e.g., 2,2-di-, 2-,3-, 4-, or 5-methyl-1-lower-alkyl-3-pyrrolidinols and including polymethyl ring substituted 1-lower-alkyl-3-pyrrolidinols having more than one methyl group on the same ring carbon atom, said pyrrolidinols being preparable as known in the art as illustrated by Lunsford U.S. Patent 2,830,997 and other sources cited therein. Representative starting methyl-1-lower-alkyl-3-pyrrolidinols are disclosed by Ryan et al., J. Org. Chem. 27, 2901–2905 (1962) and references cited therein. The di(monocarbocyclic aryl)-carbamyl chlorides may for example be prepared by the reaction of phosgene with the corresponding di(monocarbocyclic aryl)amine as illustrated in Bielstein XII, page 428.

In greater detail, the preferred procedure for the preparation of 1-lower-alkyl-3-pyrrolidyl N,N-di(monocarbocyclic aryl)-carbamates is as follows. The 1-lower-alkyl-3 - pyrrolidinol or methyl-1-lower-alkyl-3-pyrrolidinol is stirred and refluxed with an alkali or alkaline earth metal compound capable of reacting therewith to form the 3-pyrrolidinol metal alcoholate, as already mentioned above, e.g., sodium amide, in an inert organic solvent such as a hydrocarbon, e.g., xylene, or an ether, e.g., dioxane. To the product of this reaction is added, without isolation, the di(monocarbocyclic aryl) - carbamyl halide, usually the chloride, preferably an equimolar quantity thereof, and reflux is continued until the inorganic salt is no longer formed (usually several hours). The product is recovered in the normal manner. For example, the mixture is cooled, washed with water, dried over a drying agent such as anhydrous sodium sulfate, filtered, and concentrated, and the residue worked up in conventional manner, such as by fractional distillation and recrystallization.

In some cases it may be preferred to utilize the reaction of a selected di(monocarbocyclic aryl)amine with a selected 3-pyrrolidyl chloroformate in the preparation of the active ingredients of the present invention.

For determining anticholinergic activity, a standard test procedure which has special significance as to anti-parkinsonism effect is the antitremorine screen. Since known anti-parkinsonism agents are anticholinergic agents which are able to pass the blood brain barrier, and such agents are effective in suppressing tremors in the antitremorine screen, this test is an effective manner of evaluating anti-parkinsonism drugs. The compounds of the invention are effective against tremors produced in mice by 1,4-dipyrrolidino-2-butyne (tremorine) and are, therefore, active agents for the treatment of Parkinsonism.

The following procedure, which is similar to that described by G. M. Everett et al., Science 124, 79 (1956), is employed in the antitremorine screen:

Albino mice of either sex are used following a fourteen to twenty hour starvation period. At least ten mice are used for each dose level. The test drug, a control (saline) and a reference standard (i.e., atropine sulfate) are tested blindly by a single observer.

Each animal is given a challenging dose of tremorine, twenty milligrams per kilogram intraperitoneally, at one and three hours of treatment with the test material. The animals are then observed for at least thirty minutes for signs of central and peripheral effects of tremorine. Calculation of the $PD_{50}$ values follows the method of Litchfield and Wilcoxon, J. Pharmacol, Therap, 96, 99 (1949).

The following table gives a comparison of 1-methyl-3-pyrrolidyl N,N-diphenylcarbamate, when tested in the antitremorine screen in the form of the free base, with other anti-parkinsonism drugs:

PROTECTION IN MICE AGAINST THE CENTRAL EFFECTS OF TREMORINE AT TIME OF ONE HOUR CHALLENGE

| Compound | Route | $PD_{50}$, mg./kg. |
|---|---|---|
| A. 1-methyl-3-pyrrolidyl N,N-diphenyl-carbamate. | Oral | 4.5 |
| | do | 5.9 |
| | Intraperitoneally | 5.6 |
| | do | 3.7 |
| B. Atropine sulfate | Oral | 8.6 |
| | Intraperitoneally | 7.0 |
| C. Trihexylphenidyl | Oral | 32.5 |
| | Intraperitoneally | 11.2 |
| D. Caramiphen | Oral | 25.0 |
| | Intraperitoneally | 8.2 |

As shown by the foregoing, the compounds of the present invention, especially 1-methyl-3-pyrrolidyl N,N-diphenylcarbamate, when tested in the antitremorine screen, are considerably superior to anti-parkinsonism agents employed previously in that they possess a strong central anticholinergic activity as measured by the ability to inhibit tremorine-induced tremors produced by a central mechanism.

Experiments in mice have also shown that the active compounds of the invention antagonize the central effects of tremorine in an oral protective dose ($PD_{50}$) which is only about three percent of the oral lethal dose ($LD_{50}$). With regard to the production of undesirable peripheral anticholinergic effects, atropine sulfate was found to be ten to eighty times more potent than the compounds of the invention. The 1-lower-alkyl-3-pyrrolidyl N,N-di-(monocarbocyclic aryl)-carbamates are thus not only more potent antagonists of the centrally mediated effects of tremorine than atropine sulfate, caramiphen or trihexylphenidyl, but in addition exhibit a greatly diminished order of undesirable peripheral side effects.

The following examples are given by way of illustration only and are not to be construed as limiting.

*Example 1.—1-isopropyl-3-pyrrolidyl N,N-diphenylcarbamate*

A mixture of 12.9 grams (0.1 mole) of 1-isopropyl-3-pyrrolidinol, 3.9 grams (0.1 mole) of sodium amide, and 200 milliliters of dry xylene was refluxed and mechanically stirred until ammonia was no longer evolved, whereafter 23.2 grams (0.1 mole) of diphenylcarbamyl chloride in 200 milliliters of xylene was added slowly and refluxing continued for four hours. The mixture was cooled, washed with water until washings were neutral, dried over anhydrous sodium sulfate, filtered, and the filtrate concentrated. The residue was distilled at reduced pressure, giving 24.3 grams of crude product boiling at 175 to 195 degrees centigrade at 0.15 millimeter of mercury. The distillate was redistilled. Yield, 17.2 grams (53 percent); boiling point 163 to 165 degrees centigrade at 0.035 millimeter of mercury pressure; melting point 61 to 62 degrees centigrade. After two recrystallizations from isopropyl ether, the white crystalline solid melted at 63 to 64 degrees centigrade.

*Example 2.—1-methyl-3-pyrrolidyl N,N-diphenylcarbamate*

This compound was prepared in the manner of Example 1 from 1-methyl-3-pyrrolidinol, sodium amide, and N,N-diphenylcarbamyl chloride. Yield, 65 percent; boiling point 182 to 185 degress centigrade at 0.025 millimeter of mercury; melting point 82 to 85 degrees centigrade.

*Analysis.*—Calculated for $C_{18}H_{20}N_2O_6$: C, 72.95; H, 6.80; N, 9.45. Found: C, 72.95; H, 6.81; N, 8.88.

*Example 3.—1-methyl-3-pyrrolidyl N,N-diphenylcarbamate maleate*

A mixture of 1.2 grams (0.0405 mole) of the base as prepared in Example 2 and 0.47 gram (0.0405 mole) of maleic acid was dissolved in 25 milliliters of isopropyl alcohol. A white crystalline solid was precipitated from the solution by addition of dry ether and purified by several similar precipitations. Yield, 94 percent; melting point, 133 to 134 degrees centigrade.

*Analysis.*—Calculated for $C_{22}H_{24}N_2O_6$: C, 64.06; H, 5.87; N, 6.79. Found: C, 64.04; H, 5.93; N, 6.87.

*Example 4.—1-methyl-3-pyrrolidyl N,N-diphenylcarbamate furmarate*

A mixture of equimolar quantities of the free base as prepared in Example 2 and fumaric acid was dissolved in isopropyl alcohol. Isopropyl ether was added until the solution was turbid. A white crystalline solid product precipitated after several hours. The product was recrystallized from methyl ethyl ketone. Yield, 93 percent; melting point, 131.5 to 133 degrees centigrade.

*Analysis.*—Calculated for $C_{22}H_{24}N_2O_6$: C, 64.06; H, 5.87; N, 6.79. Found: C, 63.85; H, 6.00; N, 7.10.

*Example 5.—1-methyl-3-pyrrolidyl N,N-diphenylcarbamate p-toluenesulfonate*

A mixture of equimolar quantities of the free base prepared according to Example 2 and p-toluenesulfonic acid monohydrate was dissolved in ethyl acetate. The salt was precipitated as an oil by addition of ligroin (boiling point 60 to 110 degrees centigrade) and triturated with dry ether to give a white, crystalline solid; melting point 142.5 to 144 degrees centigrade. Reprecipitation and trituration failed to raise the melting point. Yield, 93 percent.

*Analysis.*—Calculated for $C_{25}H_{28}N_2O_5S$: S, 64.08; H, 6.02; N, 5.98. Found: C, 63.78; H, 6.12; N, 5.99.

*Example 6.—1-ethyl-3-pyrrolidyl N,N-diphenylcarbamate maleate*

This compound was prepared in the manner of Examples 1 and 3 from 1-ethyl-3-pyrrolidinol and diphenylcarbamyl chloride and reaction of the free base with maleic acid. Melting point, 92.5 to 94 degrees centigrade.

*Analysis.*—Calculated for $C_{23}H_{26}N_2O_6$: C, 64.77; H, 6.15; N, 6.57. Found: C, 64.47; H, 6.16; N, 6.46.

*Example 7.—1-(n-butyl)-3-pyrrolidyl N,N-diphenyl carbamate maleate*

This compound was prepared in the manner of Examples 1 and 3 from 1-(n-butyl)-3-pyrrolidinol and diphenylcarbamyl chloride and reaction of the free base with maleic acid. Melting point, 83 to 83.5 degrees centigrade.

*Analysis.*—Calculated for $C_{23}H_{30}N_2O_6$: C, 66.06; H, 6.65; N, 6.16. Found: C, 65.63; H, 6.57; N, 5.74.

*Example 8.—1,2-dimethyl-3-pyrrolidyl N,N-diphenylcarbamate*

In the same manner as given in Example 1, 1,2-dimethyl-3-pyrrolidyl N,N-diphenylcarbamate is prepared from 1,2-dimethyl-3-pyrrolidinol and diphenylcarbamyl chloride.

*Example 9.—1-isopropyl-3-pyrrolidyl N,N,-di-(p-tolyl)-carbamate*

In the same manner as given in Example 1, 1-isopropyl-3-pyrrolidyl N,N-di-(p-tolyl)-carbamate is prepared from 1 - isopropyl - 3 - pyrrolidinol and di - (p - tolyl) - carbamyl chloride.

*Example 10.—1-butyl-4-methyl N-(p-methoxyphenyl)-N-(p-trifluoromethylphenyl)-carbamate*

In the same manner as given in Example 1, 1-butyl-4 - methyl N - (p - methoxyphenyl) - N - (p - trifluoromethylphenyl)-carbamate is prepared from 1-butyl-4-methyl-3-pyrrolidinol and N-(p-methoxyphenyl)-N-(p-trifluoromethylphenyl)-carbamyl chloride.

*Example 11.—1-isopropyl-3-pyrrolidyl N,N-diphenylcarbamate hydrochloride*

In the same manner as given in Example 3, 1-isopropyl-3-pyrrolidyl N,N-diphenylcarbamate hydrochloride is prepared from 1-isopropyl-3-pyrrolidyl N,N-diphenylcarbamate, prepared as in Example 1, and hydrochloric acid.

*Example 12.—Additional 1-lower-alkyl-3-pyrrolidyl N,N-diarylcarbamates*

In the manner of the preceding examples, 1-methyl-3-pyrrolidyl N,N-bis-(p-diethylaminophenyl)-carbamate and -1-methyl-3-pyrrolidyl N-(p-chlorophenyl)-N-phenylcarbamate are prepared by reacting 1-methyl-3-pyrrolidinol together with N,N-bis-(p-diethylaminophenyl)- carbamyl chloride and N-(p-chlorophenyl)-N-phenylcarbamyl chloride, respectively.

The compounds of the foregoing examples possess a high order of central anticholinergic activity and low peripheral activity. The compounds in addition manifest desirable anti-parkinsonism activity when tested in the antitremorine screen.

*Example 13.—Formulations*

The following formulations are representative for all of the pharmacologically active compounds of the invention, but have been particularly designed to embody as the active ingredient 1-methyl-3-pyrrolidyl N,N-diphenylcarbamate in the form of an acid addition salt thereof, e.g., the maleate.

A. CAPSULES

Capsules of 2.5 milligrams, 10 milligrams, 25 milligrams, and 50 milligrams of active ingredient per capsule were prepared. With the higher amounts of active ingredient, reduction may be made in the amount of the lactose.

Blend for encapsulation:   Per capsule, milligrams
(1) 1-methyl-3-pyrrolidyl N,N-diphenylcarbamate maleate _____ 2.5
(2) Lactose _____ 299.2
(3) Starch _____ 129.0
Magnesium stearate _____ 4.3

Total _____ 435.0

The active ingredient, the lactose, the starch, and the magnesium stearate are uniformly blended and encapsulated.

B. TABLETS

I. A typical formulation for a tablet containing 5.0 milligrams of active ingredient per tablet follows. The formulation may be used for other strengths of active ingredient, in this case 1-methyl-3-pyrrolidyl N,N-diphenylcarbamate maleate, by adjustment of the weight of dicalcium phosphate.

Formulation for tablet:    Per tablet, milligrams
(1) 1-methyl-3-pyrrolidyl N,N-diphenylcarbamate maleate _____ 5.0
(2) Corn starch _____ 13.6
(3) Corn starch (paste) _____ 3.4
(4) Lactose _____ 79.2
(5) Dicalcium phosphate _____ 68.0
(6) Calcium stearate _____ 0.9

Total _____ 170.1

Uniformly blend 1, 2, 4, and 5. Prepare 3 as a ten percent paste in water. Granulate the blend with starch paste and pass the wet mass through an eight-mesh screen. The wet granulation is dried and sized through a twelve-mesh screen. The dried granules are blended with the calcium stearate and compressed.

II. An additional tablet formulation containing a higher dosage of 1-methyl-3-pyrrolidyl N,N-diphenylcarbamate maleate is prepared as follows:

Ingredients:              Per tablet, milligrams
(1) 1-methyl-3-pyrrolidyl N,N-diphenylcarbamate maleate _____ 50.0
(2) Lactose _____ 90.0
(3) Milo starch _____ 20.0
(4) Corn starch _____ 38.0
(5) Calcium stearate _____ 2.0

Total _____ 200.0

Uniformly blend 1, 2, 3, and 4. This blend is granulated using water as a granulating medium. The wet granules are passed through an eight-mesh screen and dried at 140 to 160 degrees Fahrenheit overnight. The dried granules are passed through a ten-mesh screen and blended with 5, and this blend is then converted into tablets using a suitable tablet press.

C. INJECTABLE 2.5 PERCENT STERILE SOLUTION

Ingredient:               Per cubic centimeter
(1) 1-methyl-3-pyrrolidyl N,N-diphenylcarbamate maleate _____milligrams__ 25
(2) Preservative, e.g., chlorobutanol
                       percent weight/volume__ 0.5
(3) Water for injection _____ Q.s.

Prepare solution, clarify by filtration, fill into vials, seal and autoclave.

Various modifications and equivalents will be apparent to one skilled in the art and may be made in the compounds, method and compositions of the present invention without departing from the spirit or scope thereof, and it is therefore to be understood that the invention is to be limited only by the scope of the appended claims.

I claim:

1. The method of combating depression and spasm, including symptoms of Parkinsonism, in a living animal body with a minimum of undesirable side effects comprising internally administering to said living animal body an effective amount of a compound selected from the group consisting of 1-lower-alkyl-3-pyrrolidyl N,N-di-(monocarbocyclic aryl)-carbamates wherein the lower-alkyl group contains one to four carbon atoms inclusive and wherein the monocarbocyclic aryl group is a non-toxic monocarbocyclic aryl group containing a maximum of fifteen carbon atoms selected from the group consisting of phenyl, trifluoromethylphenyl, lower-alkoxyphenyl, di-lower-alkyl-aminophenyl, lower-alkylphenyl, and halophenyl, wherein the number of substituents when present on the phenyl ring is 1 to 3, inclusive, wherein any lower-alkyl, lower-alkoxy, and di-lower-alkyl-amino substituents each have 1 to 4 carbon atoms, inclusive, and wherein all ring substituents, when present, have 1 to 9 carbon atoms, inclusive, and non-toxic pharmacologically acceptable acid-addition salts thereof.

2. The method of combating depression and spasm, including symptoms of Parkinsonism, in a living animal body with a minimum of undesirable side effects comprising internally administering to said living animal body an effective amount of 1-lower-alkyl-3-pyrrolidyl N,N-diphenylcarbamate, wherein the lower-alkyl group contains one to four carbon atoms inclusive.

3. The method of combating depression and spasm, including symptoms of Parkinsonism, in a living animal body with a minimum of undesirable side effects comprising internally administering to said living animal body an effective amount of a non-toxic pharmacologically acceptable acid-addition salt of 1-lower-alkyl-3-pyrrolidyl N,N-diphenylcarbamate wherein the lower-alkyl group contains one to four carbon atoms inclusive.

4. The method of combating depression and spasm, including symptoms of Parkinsonism, in a living animal body with a minimum of undesirable side effects comprising internally administering to said living animal body an effective amount of 1-methyl-3-pyrrolidyl N,N-diphenylcarbamate.

5. The method of combating depression and spasm, including symptoms of Parkinsonism, in a living animal body with a minimum of undesirable side effects comprising internally administering to said living animal body an effective amount of a non-toxic pharmacologically acceptable acid-addition salt of 1-methyl-3-pyrrolidyl N,N-diphenylcarbamate.

6. The method of combating depression and spasm, including symptoms of Parkinsonism, in a living animal body with a minimum of undesirable side effects comprising internally administering to said living animal body an effective amount of 1-methyl-3-pyrrolidyl N,N-diphenylcarbamate maleate.

7. A therapeutic composition suitable for combating depression and spasm, including Parkinsonism, comprising (1) an effective amount of between about 0.1 and 200 milligrams of a compound selected from the group consisting of 1-lower-alkyl-3-pyrrolidyl N,N-di-(monocarbocyclic aryl)-carbamates wherein the lower-alkyl group contains one to four carbon atoms inclusive and wherein the monocarbocyclic aryl group is a non-toxic monocarbocyclic aryl group containing a maximum of fifteen carbon atoms selected from the group consisting of phenyl, trifluoromethyl-phenyl), lower-alkoxy-phenyl, di-lower-alkyl-aminophenyl, lower-alkylphenyl, and halophenyl, wherein the number of substituents when present on the phenyl ring is 1 to 3, inclusive, wherein any lower-alkyl, lower-alkoxy, and di-lower-alkyl-amino substituents each have 1 to 4 carbon atoms, inclusive, and wherein all ring substituents, when present, have 1 to 9 carbon atoms, inclusive, and non-toxic pharmacologically acceptable acid-addition salts thereof, and (2) a pharmaceutical carrier.

8. A therapeutic composition suitable for combating depression and spasm, including Parkinsonism, comprising (1) an effective amount of between about 2.5 and 50 milligrams of 1-lower-alkyl-3-pyrrolidyl N,N-diphenylcarbamate wherein the lower-alkyl group contains one to four carbon atoms inclusive, and (2) a pharmaceutical carrier.

9. A therapeutic composition suitable for combating depression and spasm, including Parkinsonism, comprising (1) an effective amount of between about 2.5 and 50 milligrams of a non-toxic pharmacologically acceptable acid-addition salt of 1-lower-alkyl-3-pyrrolidyl-N,N-diphenylcarbamate wherein the lower-alkyl group contains one to four carbon atoms inclusive, and (2) a pharmaceutical carrier.

10. A therapeutic composition suitable for combating depression and spasm, including Parkinsonism, comprising (1) an effective amount of between about 2.5 and 50 milligrams of 1-methyl-3-pyrrolidyl N,N-diphenylcarbamate, and (2) a pharmaceutical carrier.

11. A therapeutic composition suitable for combating depression and spasm, including Parkinsonism, comprising (1) an effective amount of between about 2.5 and 25 milligrams of a non-toxic pharmacologically acceptable acid addition salt of 1-methyl-3-pyrrolidyl N,N-diphenylcarbamate, and (2) a pharmaceutical carrier.

12. A therapeutic composition suitable for combating depression and spasm, including Parkinsonism, comprising (1) an effective amount of between about 2.5 and 25 milligrams of 1-methyl-3-pyrrolidyl N,N-diphenylcarbamate maleate, and (2) a pharmaceutical carrier.

References Cited by the Examiner

UNITED STATES PATENTS

| | | | |
|---|---|---|---|
| 2,772,289 | 11/1956 | Cusic | 260—326.3 |
| 2,933,519 | 4/1960 | Sekera | 260—472 |
| 3,006,925 | 10/1961 | Feldkamp | 167—65 |

FRANK CACCIAPAGLIA, JR., *Primary Examiner.*

UNITED STATES PATENT OFFICE
CERTIFICATE OF CORRECTION

Patent No. 3,228,835                            January 11, 1966

Carl D. Lunsford

It is hereby certified that error appears in the above numbered patent requiring correction and that the said Letters Patent should read as corrected below.

Column 1, line 61, for "obejct" read -- object --; line 62, for "whic hare" read -- which are --; column 3, line 22, strike out "the", first occurrence; line 37, after "magnesium" strike out the comma; same column 3, line 64, for "to" read -- so --; column 4, line 24, for "reaching" read -- reacting --; line 51, for "di(monocarbocyclic aryl)amine" read -- di(monocarbocyclic-aryl)amine --; column 6, line 51, for "H." read -- H, --; line 65, for "S," read -- C, --; column 7, line 11, for $$C_{23}H_{30}N_2O_6 \quad\quad \text{read} \quad\quad C_{25}H_{30}N_2O_6$$

line 21, for "N,N,-" in italics, read -- N,N- --, in italics; same column 7, line 49, for "and-1-" read -- and 1- --; column 10, line 8, for "-phenyl)," read -- -phenyl, --; line 28, for "-pyrrolidyl-N,N-" read -- -pyrrolidyl N,N- --.

Signed and sealed this 13th day of December 1966.

(SEAL)
Attest:

ERNEST W. SWIDER                            EDWARD J. BRENNER
Attesting Officer                             Commissioner of Patents